(12) United States Patent
Satoh et al.

(10) Patent No.: US 7,342,242 B2
(45) Date of Patent: Mar. 11, 2008

(54) METHOD AND APPARATUS FOR ESTIMATING PHOTOMULTIPLIER SENSITIVITY CHANGE

(75) Inventors: Kimihiko Satoh, Kanagawa-ken (JP); Yasunori Ohta, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 217 days.

(21) Appl. No.: 11/226,221

(22) Filed: Sep. 15, 2005

(65) Prior Publication Data
US 2006/0054846 A1 Mar. 16, 2006

(30) Foreign Application Priority Data
Sep. 15, 2004 (JP) ............................. 2004-267970

(51) Int. Cl.
*G01N 23/04* (2006.01)
(52) U.S. Cl. ..................................................... 250/587
(58) Field of Classification Search ................ 250/580, 250/584, 586, 587
See application file for complete search history.

(56) References Cited

U.S. PATENT DOCUMENTS 3,149,968 A * 9/1964 Stephens ......................... 430/4
3,179,801 A * 4/1965 Scherbatskoy ......... 250/363.01
4,590,369 A * 5/1986 Horikawa ................. 250/252.1
5,684,888 A * 11/1997 Vuylsteke ..................... 382/128

FOREIGN PATENT DOCUMENTS

| JP | 3-132644 A | 6/1991 |
| JP | 7-31373 A | 2/1995 |
| JP | 2001-100340 A | 4/2001 |
| JP | 2002156713 A * | 5/2002 |

* cited by examiner

*Primary Examiner*—David Porta
*Assistant Examiner*—Mark R Gaworecki
(74) *Attorney, Agent, or Firm*—Sughrue Mion, PLLC

(57) ABSTRACT

A method and apparatus for estimating photmultiplier sensitivity change is provided, which is capable of properly and easily estimating the sensitivity change in a photomultiplier used in a radiation image reading unit constructed to read out a radiation image using the photomultiplier. The method and apparatus obtain exposure conditions used when the radiation image was recorded on the storage phosphor sheet by the exposure condition obtaining means, then calculate an estimated amount of radiation irradiated on the storage phosphor sheet by the sensitivity change information obtaining means based on the exposure conditions obtained by the exposure condition obtaining means, cumulatively add the estimated amount of radiation for each radiation image recorded on the storage phosphor sheet, and obtain the cumulative value of the estimated amounts as the information that indicates the sensitivity change in the photomultiplier.

19 Claims, 6 Drawing Sheets

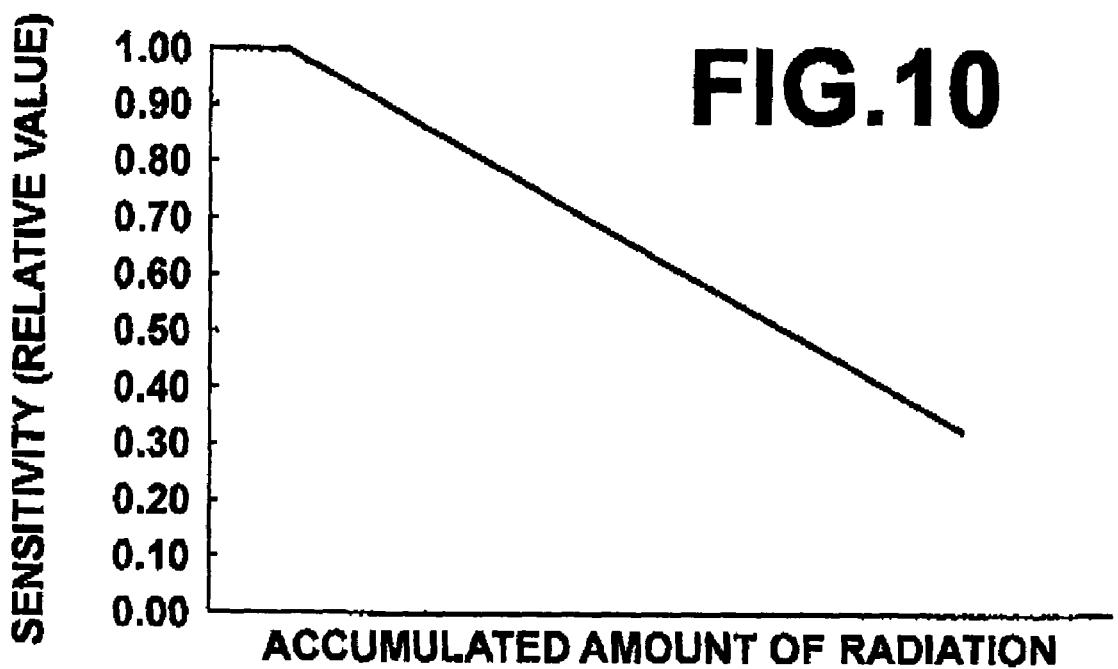

METHOD AND APPARATUS FOR ESTIMATING PHOTOMULTIPLIER SENSITIVITY CHANGE

BACKGROUND OF THE INVENTION

1. Field of the Invention

The present invention relates to a method and apparatus for estimating sensitivity change in a photomultiplier used in a radiation image reading unit constructed to read out a radiation image using the photomultiplier.

2. Description of the Related Art

Radiation image recording/reading systems that employ a storage phosphor (stimulable phosphor) are proposed. When the storage phosphor is exposed to radiation (X-ray, α-ray, β-ray, γ-ray, electron beam, ultraviolet ray, or the like), it stores a part of the radiation energy, and thereafter emits stimulated luminescence light in proportion to the radiation energy stored therein when exposed to excitation light such as visible light. In the radiation image recording/reading system, radiation image obtained by imaging a subject, such as a human body or the like, is recorded temporarily on a sheet-shaped storage phosphor sheet. Thereafter, it is scanned with excitation light, such as a light beam, to generate stimulated luminescence light, which is in turn photoelectrically read out by a reading means, such as a photomultiplier (PMT) to obtain image signals, and the radiation image of the subject is outputted on a recording material, such as a photographic sensitive material, or on a CRT display as a visible image based on the image signals.

Here, the sensitivity of the PMT (magnitude of output signal to input luminous energy) used in the radiation image recording/reading system is determined by the magnitude of the high voltage applied to the PMT. Each PMT of the same type, however, has its own characteristics which are different with each other. Thus, the voltage required for obtaining an intended sensitivity differs from PMT to PMT. Consequently, the high voltage is properly adjusted for each system to obtain an intended sensitivity at the time of factory shipment as described, for example, in Japanese Unexamined Patent Publication Nos. 3(1991)-132644 and 2001-100340.

Recently, however, it has been revealed that the sensitivity of the PMT changes as it is used. In particular, it has been demonstrated that the sensitivity of the PMT used in the radiation image recording/reading system changes significantly due to a large anode current flowing through the PMT. FIG. 10 illustrates the relationship between the cumulative amount of radiation irradiated on the storage phosphor sheet, i.e. cumulative value of anode currents flowed through the PMT and the sensitivity of the PMT. It has been demonstrated through an experiment that the sensitivity of the PMT changes to as low as approximately $\frac{1}{10}$ as cumulative amount of radiation increases, as shown in FIG. 10.

Accordingly, even if the voltage applied to the PMT is adjusted properly at the time of factory shipment, the sensitivity of the PMT changes as it is used, so that stimulated luminescence light of small luminous energy emitted from the area of the storage phosphor sheet which has been exposed to a small amount of radiation, for example, may not be detected properly. Moreover, the sensitivity change in the PMT is not discernible simply by observing the reproduced image. That is, if the image quality of the reproduced image appears degraded, one can not tell if it is due to the sensitivity change, or the image has such quality from the beginning, which may lead to improper diagnostic image interpretation.

One method for detecting the sensitivity change in the PMT using a reference light source may be conceivable, in which the sensitivity of the PMT is detected based on the relationship between the detected signal obtained by the PMT by receiving the reference light emitted from the reference light source and the reference signal which has been predetermined according to the luminous energy of the reference light. The installation of such additional reference light source, however, requires additional costs. Moreover, it will involve an immense amount of time and effort to newly install such reference light source in the systems already installed in the hospitals and the like. Thus, installation of such additional reference light source in the existing systems is unrealistic.

In addition, the sensitivity change in the PMT is presumed to be dependent on the cumulative value of anode current flowed through the PMT, the sensitivity change in the PMT may not be estimated properly based simply on the total operation time of the PMT or number of radiation images read out by the PMT, as described for example, in Japanese Patent Publication No. 7(1995)-031373.

SUMMARY OF THE INVENTION

The present invention has been developed in view of the circumstances described above, and it is an object of the present invention to provide a method and apparatus for estimating the sensitivity change in the PMT capable of estimating the sensitivity change properly and easily without using the reference light source described above.

The first method for estimating photomultiplier sensitivity change of the present invention is a method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating an estimated amount of radiation irradiated on the storage phosphor sheet based on the exposure conditions obtained;

cumulatively adding the estimated amount of radiation for each radiation image read out by the radiation image reading unit; and obtaining the cumulative value of the estimated amounts as the information that indicates the sensitivity change in the photomultiplier.

The second method for estimating photomultiplier sensitivity change of the present invention is a method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

calculating an estimated amount of radiation irradiated on the storage phosphor sheet based on the image signals detected by the photomultiplier;

cumulatively adding the estimated amount of radiation for each radiation image read out by the radiation image reading unit; and obtaining the cumulative value of the estimated amounts as the information that indicates the sensitivity change in the photomultiplier.

The first and second methods of the present invention may further comprise the step of alarming when the cumulative value has amounted to or exceeded a predetermined threshold value.

Further, the first and second methods of the present invention may further comprise the step of correcting the sensitivity of the photomultiplier based on the cumulative value.

The third method for estimating photomultiplier sensitivity change of the present invention is a method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating a first estimated amount of radiation irradiated on the storage phosphor sheet based on the exposure conditions obtained;

cumulatively adding the first estimated amount of radiation for each radiation image read out by the radiation image reading unit to obtain the first cumulative value of the estimated amounts;

calculating a second estimated amount of radiation irradiated on the storage phosphor sheet based on the image signals detected by the photomultiplier;

cumulatively adding the estimated amount of radiation for each radiation image read out by the radiation image reading unit to obtain the second cumulative value of the estimated amounts; and obtaining the difference between the first and second cumulative values as the information that indicates the sensitivity change in the photomultiplier.

The third method of the present invention may further comprise the step of alarming when the difference between the first and second cumulative values has amounted to or exceeded a predetermined threshold value.

Further, the third method of the present invention may further comprise the step of correcting the sensitivity of the photomultiplier based on the difference between the first and second cumulative values.

The first apparatus for estimating photomultiplier sensitivity change of the present invention is an apparatus for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, the apparatus comprising:

an exposure condition obtaining means constructed to obtain exposure conditions which were set when the radiation image was recorded on the storage phosphor sheet; and a sensitivity change information obtaining means constructed to calculate an estimated amount of radiation irradiated on the storage phosphor sheet based on the exposure conditions obtained by the exposure condition obtaining means, to cumulatively add the estimated amount of radiation for each radiation image read out by the radiation image reading unit, and to obtain the cumulative value of the estimated amounts as the information that indicates the sensitivity change in the photomultiplier.

The first apparatus of the present invention may further comprise an alarming means for alarming when the cumulative value has amounted to or exceeded a predetermined threshold value.

Further, the first apparatus of the present invention may further comprise a sensitivity correcting means constructed to correct the sensitivity of the photomultiplier based on the cumulative value.

Still further, the exposure conditions may be imaging menu items selected.

The second apparatus for estimating photomultiplier sensitivity change of the present invention is an apparatus for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, the apparatus comprising a sensitivity change information obtaining means constructed to calculate an estimated amount of radiation irradiated on the storage phosphor sheet based on the image signals detected by the photomultiplier, to cumulatively add the estimated amount of radiation for each radiation image read out by the radiation image reading unit, and to obtain the cumulative value of the estimated amounts as the information that indicates the sensitivity change in the photomultiplier.

The second apparatus of the present invention may further comprise an alarming means for alarming when the cumulative value has amounted to or exceeded a predetermined threshold value.

Further, the second apparatus of the present invention may further comprise a sensitivity correcting means constructed to correct the sensitivity of the photomultiplier based on the cumulative value.

The third apparatus for estimating photomultiplier sensitivity change of the present invention is an apparatus for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, the apparatus comprising:

an exposure condition obtaining means constructed to obtain exposure conditions which were set when the radiation image was recorded on the storage phosphor sheet;

a sensitivity change information obtaining means constructed to calculate a first estimated amount of radiation irradiated on the storage phosphor sheet based on the exposure conditions obtained by the exposure condition obtaining means, to cumulatively add the first estimated amount of radiation for each radiation image read out by the radiation image reading unit to obtain the first cumulative value of the estimated amounts, to calculate a second estimated amount of radiation irradiated on the storage phosphor sheet based on the image signals detected by the photomultiplier, to cumulatively add the second estimated amount of radiation for each radiation image read out by the radiation image reading unit to obtain the second cumulative value of the estimated amounts, and to obtain the difference between the first and second cumulative values as the information that indicates the sensitivity change in the photomultiplier.

The third apparatus of the present invention may further comprise an alarming means for alarming when the difference between the first and second cumulative values has amounted to or exceeded a predetermined threshold value.

Further, the third apparatus of the present invention may further comprise a sensitivity correcting means constructed to correct the sensitivity of the photomultiplier based on the difference between the first and second cumulative values.

Here, in the first method and apparatus of the present invention, the "exposure conditions" mean the conditions which are set in the radiation image recording unit when recording the radiation image on the storage phosphor sheet, which indicate directly or indirectly the amount of radiation to be irradiated on the storage phosphor sheet. The exposure conditions may include, for example, the amount of radiation to be emitted from the radiation source, tube current of the radiation source, tube voltage of the radiation source, size of the storage phosphor sheet, imaging menu items, and irradiation time of the radiation. Not all of these exposure conditions are required, and the method and apparatus may be constructed to obtain at least one of these conditions.

The referent of "imaging menu items" described above means items that identify the imaging region, imaging method, and the like which are set in the radiation image recording unit.

The "exposure conditions" described above may be set through the input device of the radiation image recording unit, or by inputting them in a computer or the like connected to the unit through a network and transmitting them to the unit.

Further, in the first method and apparatus of the present invention, the timing of cumulatively adding the estimated amount of radiation may be either before or after the radiation image reading.

In the second and third methods and apparatuses of the present invention, the timing of cumulatively adding the estimated amount of radiation may be each time when a single radiation image is read out, or every time when a plurality of radiation images are read out with the estimated amount of radiation for each reading being stored.

According to the first method and apparatus of the present invention, exposure conditions which were set when the radiation image was recorded on the storage phosphor sheet is obtained, then an estimated amount of radiation irradiated on the storage phosphor sheet is calculated based on the exposure conditions obtained, and the estimated amount of radiation for each radiation image read out by the radiation image reading unit is cumulatively added, and the cumulative value of the estimated amounts is obtained as the information that indicates the sensitivity change in the photomultiplier. This allows sensitivity change in the photomultiplier to be estimated properly and easily without requiring the reference light source or the like.

According to the second method and apparatus of the present invention, an estimated amount of radiation irradiated on the storage phosphor sheet is calculated based on the image signals detected by the photomultiplier, then the estimated amount of radiation for each radiation image read out by the radiation image reading unit is cumulatively added, and the cumulative value of the estimated amounts is obtained as the information that indicates the sensitivity change in the photomultiplier. This allows sensitivity change in the photomultiplier to be estimated properly and easily, as in the first method and apparatus of the present invention. In addition, the second method and apparatus of the present invention use image signals detected by the photomultiplier for the calculation of the estimated amount of radiation, so that the sensitivity change may be estimated more accurately than in the first method and apparatus of the present invention.

According to the third method and apparatus for estimating photomultiplier sensitivity change of the present invention, exposure conditions which were set when the radiation image was recorded on the storage phosphor sheet is obtained, a first estimated amount of radiation irradiated on the storage phosphor sheet is calculated based on the exposure conditions obtained and the first estimated amount of radiation for each radiation image read out by the radiation image reading unit is cumulatively added to obtain the first cumulative value of the estimated amounts, a second estimated amount of radiation irradiated on the storage phosphor sheet is calculated based on the image signals detected by the photomultiplier, the estimated amount of radiation for each radiation image read out by the radiation image reading unit is cumulatively added to obtain the second cumulative value of the estimated amounts, then the difference between the first and second cumulative values is obtained as the information that indicates the sensitivity change in the photomultiplier. This may provide identical effects to those provided by the first and second methods and apparatuses of the present invention.

Further, if the first, second, and third methods and apparatuses of the present invention are adapted to issue an alarm based on the information that indicates the sensitivity change in the photomultiplier, the sensitivity change in the photomultiplier may be learned more clearly.

Still further, if the first, second, and third methods and apparatuses of the present invention are adapted to correct the sensitivity of the photomultiplier based on the information that indicates the sensitivity change in the photomultiplier, a radiation image which is appropriate for use in diagnostic image interpretation may be reproduced even if the sensitivity of the photomultiplier is changed.

BRIEF DESCRIPTION OF THE DRAWINGS

FIG. 10 is a graph, illustrating the sensitivity change in a photomultiplier.

DESCRIPTION OF THE PREFERRED EMBODIMENTS

Hereinafter, a radiation image recording/reading system that employs a first embodiment of the sensitivity change estimating method and apparatus of the present invention will be described with reference to the accompanying drawings.

Figure 1:
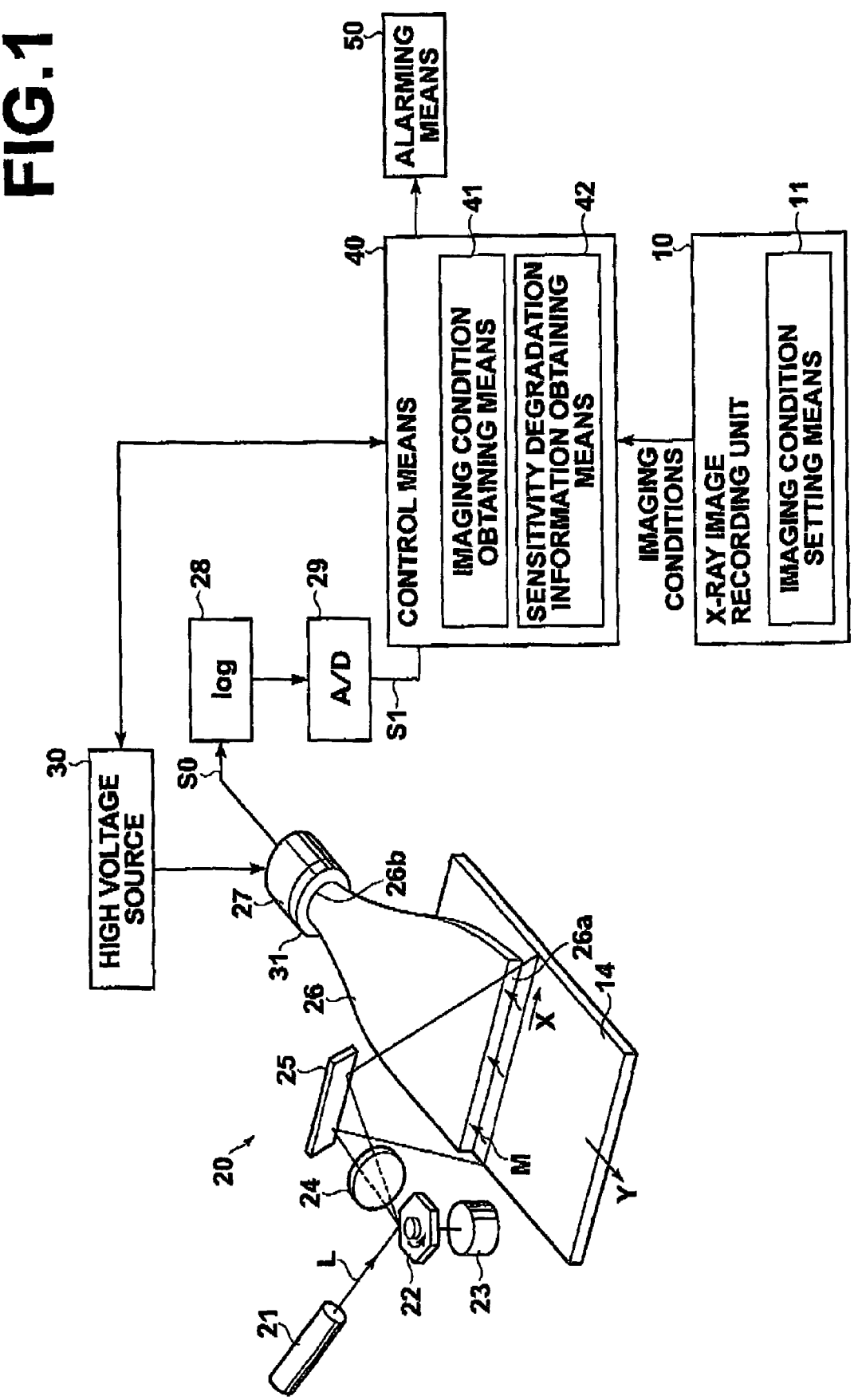
FIG. 1 is a schematic block diagram of a radiation image recording/reading system that employs a first embodiment of the sensitivity change estimating method and apparatus of the present invention, illustrating the configuration thereof.

As shown in FIG. 1, the radiation image recording/reading system that employs a first embodiment of the present invention has an X-raying unit 10 capable of X-raying a subject using an storage phosphor sheet; and a radiation image reading unit 20 constructed to read out from the storage phosphor sheet image signals that correspond to an X-ray image recorded thereon by the X-raying unit 10.

Figure 2:
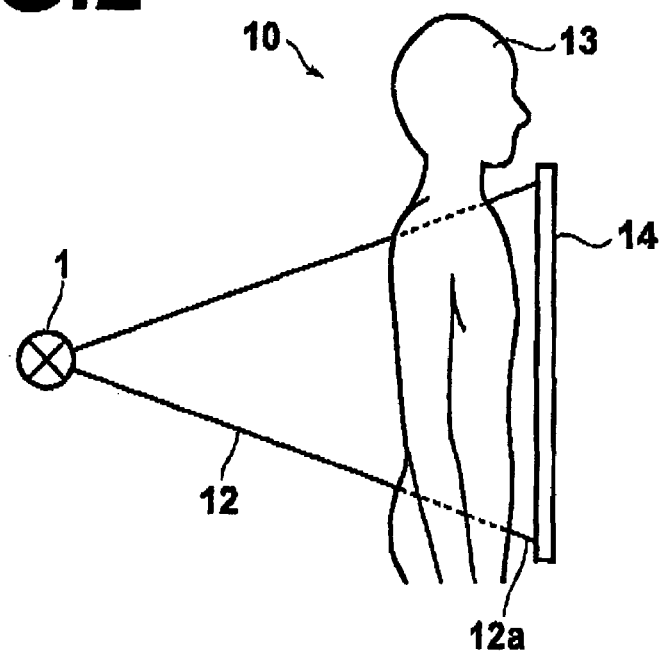
FIG. 2 is a drawing for illustrating the operation of the X-raying unit of the radiation image recording/reading system shown in FIG. 1.

As shown in FIG. 2, the X-raying unit 10 has an X-ray source 1 from which X-rays 12 are emitted to a subject 13, and X-rays 12a transmitted through the subject 13 are irradiated on the storage phosphor sheet 14, thereby an X-ray image of the subject 13 is recorded on the storage phosphor sheet. As shown in FIG. 1, the X-raying unit 10 further has an exposure condition setting means 11, which allows the imaging engineer or the like to set exposure conditions at will for imaging such X-ray image described above.

Here, the exposure conditions include, for example, imaging menu items that identify the imaging region, imaging method and the like, tube current or voltage of the X-ray source 1, size of the storage phosphor sheet 14, and irradiation time of the X-rays, which indirectly indicate the amount of radiation to be irradiated on the storage phosphor sheet. The exposure condition setting means 11 allows the imaging engineer or the like to set at least one of these conditions. In the present invention, the exposure conditions are set through the exposure condition setting means 11 provided in the X-raying unit 10. But the present invention is not limited to this. The present invention may be adapted to set the exposure conditions through a computer or the like connected to the X-raying unit 10 through a network or the like, or it may be adapted to read out the exposure conditions from a server or the like connected to the X-raying unit 10 through a network or the like.

As shown in FIG. 1, the radiation image reading unit 20 has a conveyor means (not shown) for conveying (sub-scanning) the storage phosphor sheet 14 which is set in place in the direction indicated by an arrow Y, a laser source 21 for emitting excitation light L; a rotational polygon mirror 22 for reflecting and deflecting the excitation light L emitted from the laser source 21; a motor 23 for rapidly rotating the rotational polygon mirror 22 in the direction indicated by an arrow; a focusing lens 24, such as an fθ lens or the like, for focusing the excitation light L reflected and deflected by the rotational polygon mirror driven by the motor 23 and rotating rapidly in the direction indicated by the arrow; a mirror 25 for altering the light path of the excitation light L transmitted through the focusing lens 24 so that it is incident on the storage phosphor sheet 14. The radiation image reading unit 20 further has: a light guide 26 for guiding the stimulated luminescence light M emitted from the spot on the storage phosphor sheet 14 where the laser beam 24 has been irradiated; a photomultiplier (PMT) 27 for photoelectrically detecting the stimulated luminescence light M guided through the light guide 26 to output an analog image signal S0; a logarithmic amplifier 28 for logarithmically amplifying the analog image signal S0 outputted from the PMT 27; an A/D converter 29 for converting the analog image signal S0 amplified by the logarithmic amplifier 28 to a digital image signal S1, control means 40 for obtaining information that indicates the sensitivity change in the PMT 27, as well as for assuming overall control of the radiation image reading unit; and alarming means 50 for alarming based on the information that indicates the sensitivity change in the PMT 27 obtained by the control means 40.

Hereinafter, the operation of the radiation image recording/reading system that employs the first embodiment of the present invention will be described.

In the radiation image recording/reading system that employs the first embodiment of the present invention, an X-ray image is initially recorded on the storage phosphor sheet 14 by the X-raying unit 10 as described above, and the storage phosphor sheet 14 having the X-ray image recorded thereon is set in place in the radiation image reading unit 20. Then, the storage phosphor sheet 14 set in place is conveyed (sub-scanned) in the direction indicated by the arrow Y by the conveyor means which is not shown in the drawing. In the mean time, the excitation light L emitted from the laser source 21 is reflected and deflected by the rotational polygon mirror 22 driven by the motor 23 and rotating rapidly in the direction indicated by the arrow. Then the light path of the excitation light L is altered by the mirror 25 after transmitting through the focusing lens 24 and is incident on the storage phosphor sheet 14 to main scan the storage phosphor sheet 14 in the direction indicated by an arrow X, which is substantially orthogonal to the sub-scanning direction. The storage phosphor sheet 14 emits an amount of stimulated luminescence light M in proportion to the X-ray image recorded thereon from the spot where the excitation light has been irradiated. The stimulated luminescence light M is guided through the light guide 26 and photoelectrically detected by the PMT 27. The light guide 26 is formed of a light guiding material such as an acrylic plate and disposed such that a straight input edge 26a extends along the main scanning line on the storage phosphor sheet 14. The light receiving surface of the PMT 27 is connected to an annular output edge 26b of the light guide 26. The stimulated luminescence light M entered the light guide 26 from the input edge 26a propagates through the light guide 26 by repeating total reflection and exits from the output edge 26b, which is received by the PMT 27 after passing through an excitation light cutoff filter 31 for cutting off the excitation light L, and the stimulated luminescence light M representing the X-ray image is converted to analog signals S0 by the PMT 27.

The analog signals S0 outputted from the PMT 27 are logarithmically amplified by the logarithmic amplifier 28, and converted to digital signals S1. A predetermined image processing is perform on the digital signals S1 by an image processing unit (not shown) after being inputted to the control means 40. Thereafter, a visible image is reproduced by an image output unit based on the digital signals S1.

Here, the control means 40 obtains information that indicates the sensitivity change in the PMT 27, as well as obtaining and outputting digital signals in the manner described above. As shown in FIG. 1, the control means 40 has: an exposure condition obtaining means 41 for obtaining exposure conditions from the X-raying unit 10; and a sensitivity change information obtaining means 42 for obtaining information that indicates the sensitivity change in the PMT 27 based on the exposure conditions obtained by the exposure condition obtaining means 41. The exposure condition obtaining means 41 obtains exposure conditions which were set by the exposure condition setting means 11, and outputs the exposure conditions obtained to the sensitivity change information obtaining means 42. The sensitivity change information obtaining means 42 obtains, for example, tube current of the X-ray source 1 and size of the storage phosphor sheet 14 as the exposure conditions, and calculates an estimated amount of radiation irradiated on the storage phosphor sheet 14 based on the information of these exposure conditions. More specifically, the sensitivity change information obtaining means 42 calculates the estimated amount of radiation based on the tube current and size of the storage phosphor sheet 14 using a formula or a table that has been installed in advance and is capable of calculating an estimated amount of radiation that increases according to the increase in the product of the tube current and size of the storage phosphor sheet 14, and stores the result. The estimated radiation dosage is calculated each time a radiation image recorded on the storage phosphor sheet is read out in the manner described above, which is cumulatively added and the cumulative value of the estimated amounts is obtained as the information that indicates the sensitivity change in the PMT 27. In the radiation image recording/reading system of the present embodiment, the cumulative value is calculated each time after the radiation image is read out as described above. The system is not necessarily constructed to calculate the cumulative value after the radiation image is read out. It may be constructed to calculate the estimated amount of radiation to obtain the cumulative value prior to reading out the radiation image based on the exposure conditions of the storage phosphor sheet 14 to be read out.

Figure 3:
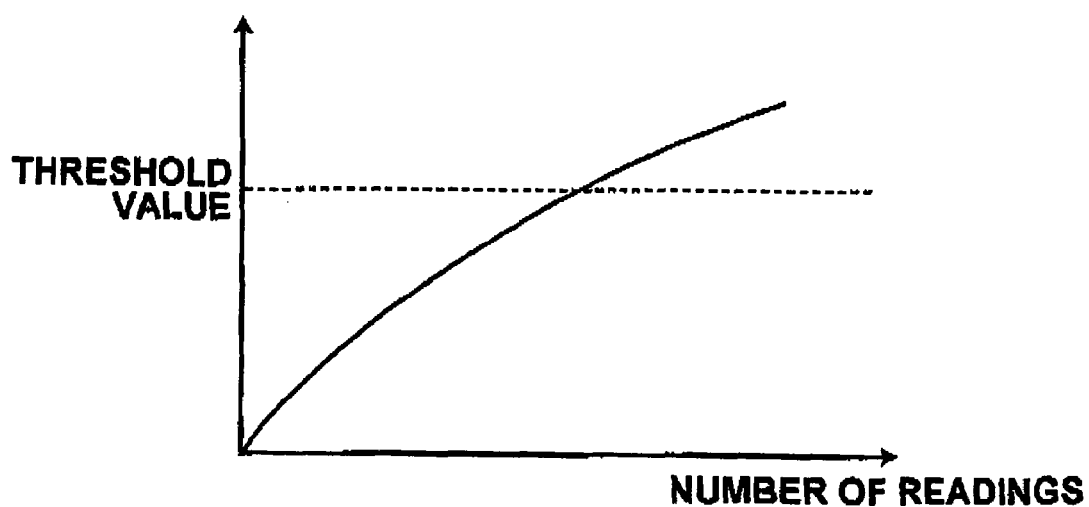
FIG. 3 is a drawing, illustrating the relationship between the number of radiation image readings and the cumulative value of the estimated amount of radiation in the radiation image recording/reading system shown in FIG. 1.

For example, when the cumulative value has amounted to or exceeded a predetermined threshold value as shown in FIG. 3, a signal that indicates this is outputted to the alarming means 50. In response to the signal, the alarming means 50, for example, displays a message requesting replacement of the PMT 27 or the like, or turns on an alarm lamp or the like.

In the first embodiment described above, the estimated amount of radiation is calculated based on the tube current and size of the storage phosphor sheet 14. But the estimated amount of radiation may also be calculated using other exposure conditions. Further, information that indirectly indicates the estimated amount of radiation is obtained, and the cumulative value of the information may be obtained, instead of directly calculating the estimated amount of radiation.

Further, in the first embodiment described above, the exposure conditions are obtained by the control means 40 of the radiation image reading unit 20, and the estimated amount of radiation is calculated based on the exposure conditions obtained by the control means 40. Alternatively, for example, an estimated amount of radiation may have been allocated to each imaging menu item in advance in the X-raying unit 10, and the estimated amount of radiation according to a selected imaging menu item may be outputted from the X-raying unit 10 to the control means 40 in the radiation image reading unit 20.

Still further, in the first embodiment described above, for example, the relationship between the cumulative value and level of sensitivity change in the PMT 27 may have been obtained in advance, and the sensitivity of the PMT 27 may be corrected by controlling the output voltage of a high voltage source 30 to compensate for the amount of sensitivity change.

Further, in the first embodiment described above, the timing for accumulating the estimated amount of radiation is not necessarily at a time after the radiation image is read out. The embodiment may be adapted to accumulate the estimated amount of radiation calculated based on the exposure conditions of the storage phosphor sheet to be read out prior to reading out the radiation image.

Hereinafter, a radiation image recording/reading system that employs a second embodiment of the sensitivity change estimating method and apparatus of the present invention will be described.

The radiation image recording/reading system that employs the second embodiment of the present invention is almost identical in construction to the radiation image recording/reading system that employs the first embodiment of the present invention shown in FIG. 1, but differs in the function of the sensitivity change information obtaining means 42. The radiation image recording/reading system that employs the second embodiment of the present invention obtains an estimated amount of radiation irradiated on the storage phosphor sheet 14 based on the image signals outputted from the PMT 27, instead of basing on the exposure conditions as in the radiation image recording/reading system that employs the first embodiment of the present invention. Other configurations and functions are identical to those of the radiation image recording/reading system that employs the first embodiment of the present invention.

Figure 4:
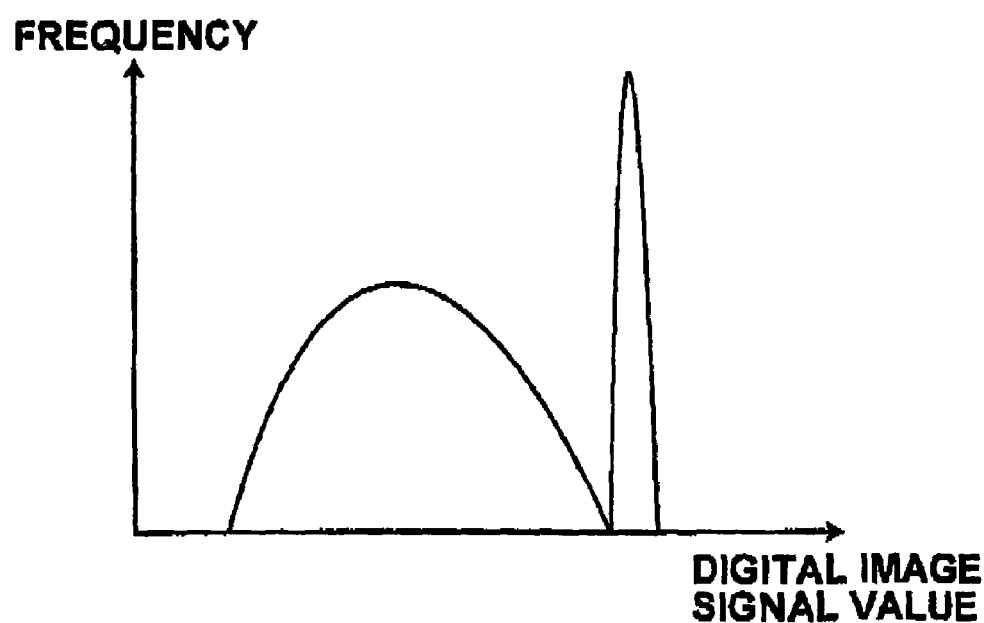
FIG. 4 is a histogram of the image signals read out in the radiation image recording/reading system shown in FIG. 1.

More specifically, the analog image signals obtained by reading out a radiation image from the storage phosphor sheet 14 in the same manner as described in the radiation image recording/reading system that employs the first embodiment and outputted from PMT 27 are logarithmically amplified by the logarithmic amplifier 28. Then, the amplified analog image signals S0 are converted to digital image signals by the A/D converter 29 and stored in a storage means (not shown) in the control means 40. Thereafter, a histogram of the digital image signals like that shown in FIG. 4 is generated by the sensitivity change information obtaining means 42 based on the digital image signals stored in the storage means. Then, the integrated value of the histogram shown in FIG. 4 is calculated, and the value so calculated is obtained as the estimated amount of radiation irradiated on the storage phosphor sheet 14.

The estimated amount of radiation is cumulatively added each time a radiation image is read out to obtain the cumulative value as the information that indicates the sensitivity change in the PMT 27 as in the radiation image recording/reading system that employs the first embodiment. Thereafter, when the cumulative value has amounted to or exceeded a predetermined threshold value, an alarm is issued by the alarming means 50 in the same manner as described above.

As in the radiation image recording/reading system that employs the first embodiment, in the radiation image recording/reading system that employs the second embodiment, for example, the relationship between the cumulative value and level of sensitivity change in the PMT 27 may have been obtained in advance, and the sensitivity of the PMT 27 may be corrected by controlling the output voltage of the high voltage source 30 to compensate for the amount of sensitivity change.

Figure 5:
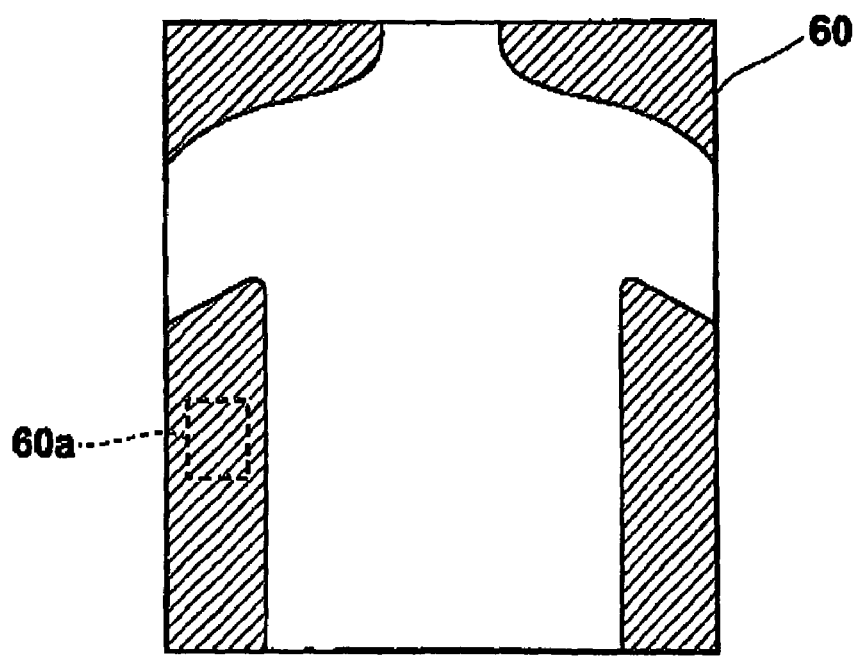
FIG. 5 is a drawing for illustrating a directly exposed region of a radiation image.

In the radiation image recording/reading system that employs the second embodiment, the estimated amount of radiation is obtained based on the integrated value of the histogram of the digital image signals corresponding to the radiation image. Alternatively, for example, an imaging menu item having imaging region information is obtained by the exposure condition obtaining means 41 from the X-raying unit 10, then a directly exposed region is identified based on the imaging region information, and the estimated amount of radiation is obtained based on the digital image signals corresponding to the directly exposed region. The referent of "directly exposed region" as used herein means, for example, a region 60a on a chest radiation image 60 shown in FIG. 5, which is formed by digital image signals read out from the region on the storage phosphor sheet 14 where radiation is exposed directly without transmitting through the subject.

Further, in the radiation image recording/reading system that employs the second embodiment, the estimated amount of radiation may be obtained based on processed digital image signals obtained through image processing, such as a predetermined normalization process and an image reducing process, performed on the digital image signals outputted from the A/D converter 29.

Hereinafter, the radiation image recording/reading system that employs a third embodiment of the sensitivity change estimating method and apparatus of the present invention will be described.

The radiation image recording/reading system that employs the third embodiment of the present invention is almost identical in construction to the radiation image recording/reading system that employs the first embodiment of the present invention shown in FIG. 1, but differs in the function of the sensitivity change information obtaining means 42. Other configurations and functions are identical to those of the radiation image recording/reading system that employs the first embodiment of the present invention.

The radiation image recording/reading system that employs the third embodiment of the present invention obtains a first estimated amount of radiation irradiated on the storage phosphor sheet 14 based on the exposure conditions as in the radiation image recording/reading system that employs the first embodiment of the present invention, and cumulatively add the estimated amount of radiation to obtain the first cumulative value of the estimated amounts. In addition, the system further obtains a second estimated amount of radiation irradiated on the storage phosphor sheet 14 based on the image signals outputted from the PMT 27 as in the radiation image recording/reading system that employs the second embodiment of the present invention, and cumulatively add the estimated amount of radiation to obtain the second cumulative value of the estimated amounts. Then, it obtains the difference between the first and second cumulative values as the information that indicates the sensitivity change in the PMT 27.

Figure 6:
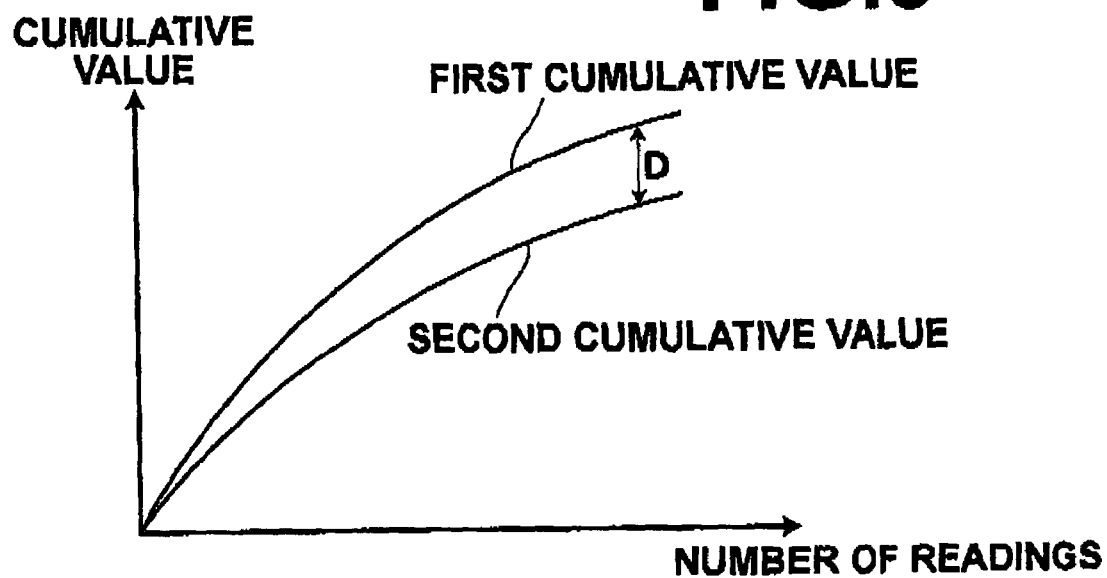
FIG. 6 is a drawing for illustrating the method for detecting sensitivity change in the radiation image recording/reading system that employs a third embodiment of the sensitivity change estimating method and apparatus of the present invention.

The second cumulative value obtained based on the image signals is affected by the sensitivity change in the PMT 27, so that the relationship between the first cumulative value obtained based on the exposure conditions and the second cumulative value becomes, for example, as shown in FIG. 6. Thus, the radiation image recording/reading system that employs the third embodiment of the present invention calculates difference D shown in FIG. 6 and obtains the calculated difference D as the information that indicates the sensitivity change in the PMT 27.

In the radiation image recording/reading system that employs the third embodiment of the present invention, when the difference D has amounted to or exceeded a predetermined threshold value, an alarm is issued by the alarming means 50, as in the radiation image recording/reading system that employs the first or second embodiment of the present invention.

Further, in the radiation image recording/reading system that employs the third embodiment of the present invention, for example, the relationship between the difference D and level of sensitivity change in the PMT 27 may have been obtained in advance, and the sensitivity of the PMT 27 may be corrected by controlling the output voltage of the high voltage source 30 to compensate for the amount of sensitivity change, as in the radiation image recording/reading system that employs the first or second embodiment of the present invention.

Further, in the radiation image recording/reading system that employs the first or second embodiment of the present invention, when the cumulative value has amounted to or exceeded a predetermined threshold value, an alarm is issued by the alarming means 50, and in the radiation image recording/reading system that employs the third embodiment of the present invention, when the difference between the first and second cumulative values has amounted to or exceeded a predetermined threshold value, an alarm is issued by the alarming means 50. The radiation image recording/reading system that employs the first, second, or third embodiment of the present invention may be constructed to further measure the sensitivity of the PMT more accurately in such a case.

Figure 7:
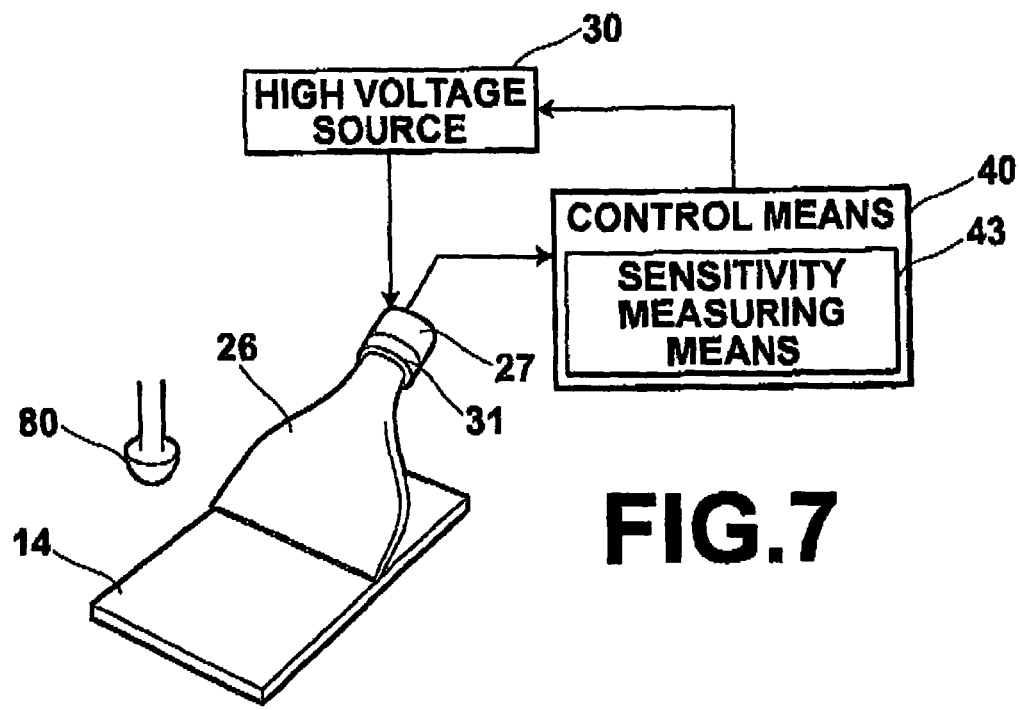
FIG. 7 is a drawing, illustrating another embodiment of the radiation image recording/reading system that employs the first, second, and third embodiments of the sensitivity change estimating method and apparatus of the present invention.

More specifically, for example, a reference light source 80 constructed to emit reference light having a predetermined luminous energy may be further provided as shown in FIG. 7, and the sensitivity of the PMT 27 may be measured using the reference light source 80. When measuring the sensitivity of the PMT 27, the reference light source 80 is activated based on a control signal from the control means 40, and reference light having a predetermined luminous energy is emitted from the reference light source 80. The reference light emitted from the reference light source 80 enters the light guide 26 from the input edge 26a, guided through the light guide 26, and exits from the output edge 26b. Then it is passed through the excitation light cutoff filter 31 for cutting of the excitation light L, and received by the PMT 27 where it is detected electrically through a photoelectric conversion. The analog detection signal detected by the PMT 27 is logarithmically amplified by the logarithmic amplifier 28, which is then converted to a digital detection signal S3 by the A/D converter 29, and inputted to a sensitivity measuring means 43 provided in the control means 40. In FIG. 7, components identical to those shown in FIG. 1 are omitted for clarity.

The sensitivity measuring means 43 has a preset reference signal having a magnitude corresponding to the predetermined luminous energy. The referent of "a reference signal" as used herein means a digital signal obtained by receiving the reference light with a PMT 27 which has not substantially changed in the sensitivity, and processing the analog signal outputted from the PMT 27 in the same manner as described above, which has been preset to the sensitivity measuring means 43 prior to obtaining the digital detection signal S3. For example, an unused PMT 27, a used PMT 27 which has not substantially changed in the sensitivity, or a used PMT 27 which has slightly changed in the sensitivity but the level of the sensitivity change is within the allowable range for the sensitivity measurement may be used to detect the reference light.

Then, the sensitivity measuring means 43 measures the sensitivity of the PMT 27 to be tested based on the relationship between the digital detected signal S3 detected in the manner as described above and the reference signal. The referent of "measures the sensitivity of the PMT 27 to be tested based on the relationship between the digital detected signal S3 and the reference signal" may include, for example, calculating the ratio of the digital detected signal S3 to the reference signal. But other known sensitivity calculation methods may also be used.

Further, the radiation image recording/reading system that employs the first, second, or third embodiment of the present invention may be constructed to further correct the sensitivity of the PMT 27 based on the sensitivity of the PMT 27 measured in the manner described above by controlling the output voltage of the high voltage source 30 to compensate for the amount of the sensitivity change.

Preferably, for example, an LED or a LD is used as the reference light source 80. If the storage phosphor sheet 14 emits stimulated luminescence light having a blue wavelength when exposed to red excitation light, a blue LED may be used as the reference light source 80. The reference light source 80 is not limited to a blue LED. Any reference light source that will emit the reference light having a wavelength in other wavelength range may be used, as long as the excitation light cutoff filter has the transmission factor of not less than 1% for that wavelength. For example, a reference light source that will emit the reference light having a wavelength in the infrared region (for example, a wavelength of not less than 800 nm) may be used. As for the reference light source that will emit the reference light having a wavelength in the infrared region, for example, a very inexpensive infrared LED may be used.

Figure 8:
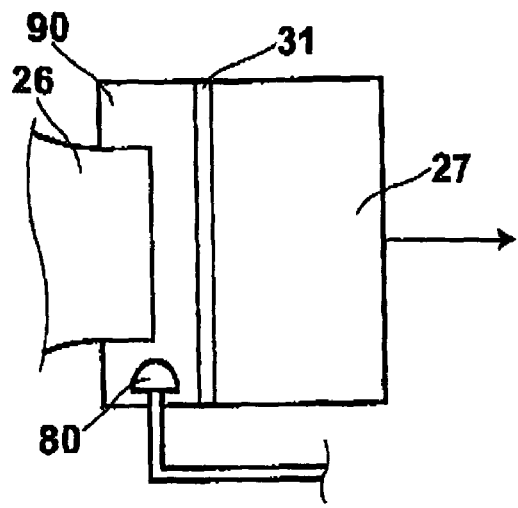
FIG. 8 is a drawing, illustrating still another embodiment of the radiation image recording/reading system that employs the first, second, and third embodiments of the sensitivity change estimating method and apparatus of the present invention.

Further, for example, a jointing section 90 for jointing the light guide 26 to the light receiving surface of the PMT 27 through the excitation light cutoff filter 31 may be formed with an adhesive that transmits the reference light, and the reference light source 80 may be embedded in the jointing section 90, as shown in FIG. 8. By sealing the reference light source 80 in the jointing section 90, dust and dirt are prevented from adhering to it, thereby the reference light having a steady luminous energy may be detected by the PMT 27. As for the adhesive described above, for example, a silicon adhesive may be used.

Still further, an alternative configuration may also be made, in which a jointing section 90 is provided in the same manner as described above, and a length of optical fiber is connected to the jointing section 90 such that one end face 84a of the fiber locates in the jointing section 90, and the other end face 84b is connected to an air tight housing 85. In this configuration, the reference light emitted from the reference light source 80 installed in the housing enters from the end face 84b, guided through the fiber, and exits from the end face 84a, which is then detected by the PMT 27.

Figure 9:
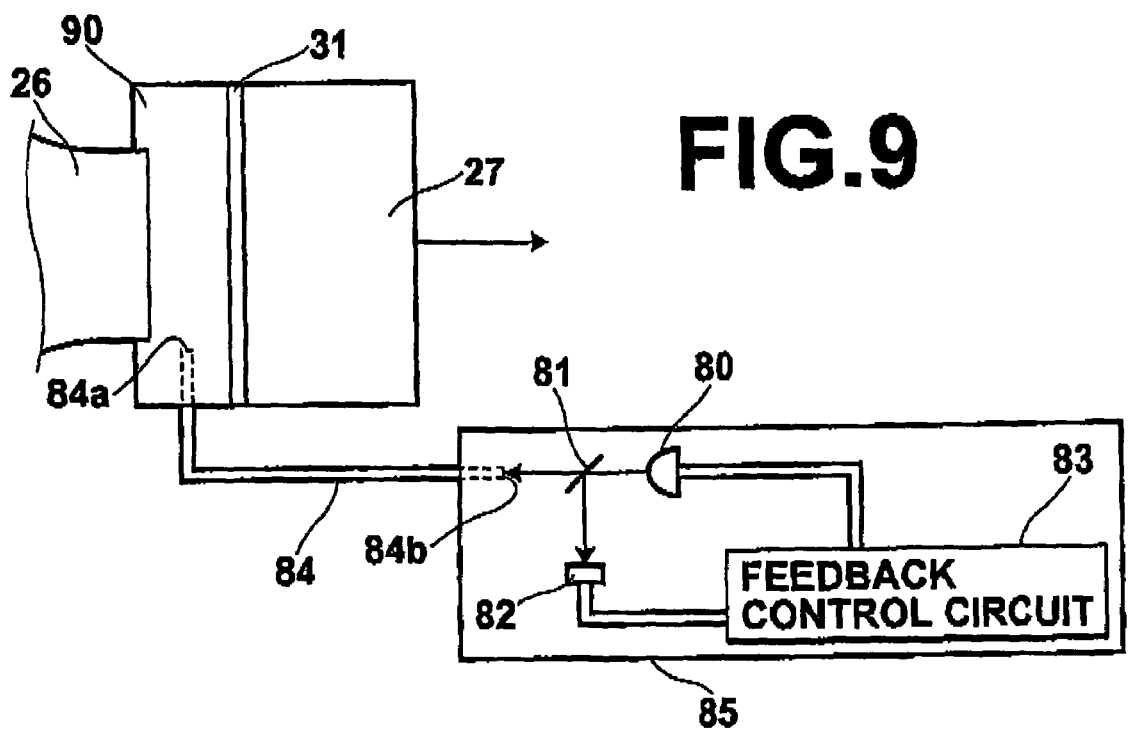
FIG. 9 is a drawing, illustrating further embodiment of the radiation image recording/reading system that employs the first, second, and third embodiments of the sensitivity change estimating method and apparatus of the present invention.

Further, as shown in FIG. 9, a photodiode 82 for detecting the luminous energy of the reference light, and a feedback control circuit 83 for drive-controlling the reference light source 80 to maintain constant the luminous energy of the reference light emitted therefrom based on the luminous energy detected by the photodiode 82 may be further installed in the housing 85. As shown in FIG. 9, the housing 85 further has a dichroic mirror 81 therein, which is arranged such that the reflected light reflected at the dichroic mirror 81 is detected by the photodiode 82, and the transmitted light transmitted through the mirror 81 enters the end face 84b of the fiber 84. Preferably, the luminous energy of the reflected light is substantially greater than that of the transmitted light. Preferably, for example, the transmission factor of the dichroic mirror 91 for the reference light is around 1%. The arrangement of making the luminous energy of the reflected light substantially greater than that of the transmitted light may provide more stable luminous energy control through the feedback circuit. In addition, a filter or the like may be further provided between the dichroic mirror 81 and the end face 84b of the fiber 84 for attenuating the luminous energy of the reference light transmitted through the dichroic mirror 81.

In the radiation image recording/reading system that employs the first, second, or third embodiment of the present invention, the magnitude of the voltage applied to the PMT 27 is adjusted in accordance with the level of sensitivity change in the PMT 27. An alternative arrangement may also be made in which the magnitude of the voltage applied to the PMT 27 is adjusted by further taking into account the sensitivity change in the storage phosphor sheet 14. More specifically, for example, a barcode or an IC chip may be attached to the storage phosphor sheet 14 to record information that indicates the level of sensitivity change in the storage phosphor sheet 14, such as the number of recordings or readings. In addition, a voltage value for compensating for the sensitivity change in the storage phosphor sheet 14 may be preset to the control means 40, thereby it may be added to the voltage corresponding to the sensitivity change in the PMT 27 obtained based on the information described above.

What is claimed is:

1. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating an estimated amount of radiation irradiated on the storage phosphor sheet based on the exposure conditions obtained;

cumulatively adding the estimated amount of radiation for each radiation image read out by the radiation image reading unit; and obtaining the cumulative value of the estimated amounts as the information that indicates the sensitivity change in the photomultiplier.

2. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

calculating an estimated amount of radiation irradiated on the storage phosphor sheet based on the image signals detected by the photomultiplier;

cumulatively adding the estimated amount of radiation for each radiation image read out by the radiation image reading unit; and obtaining the cumulative value of the estimated amounts as the information that indicates the sensitivity change in the photomultiplier.

3. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating an estimated amount of radiation irradiated on the storage phosphor sheet based on the exposure conditions obtained;

cumulatively adding the estimated amount of radiation for each radiation image read out by the radiation image reading unit;

obtaining the cumulative value of the estimated amounts as the information that indicates the sensitivity change in the photomultiplier; and alarming when the cumulative value has amounted to or exceeded a predetermined threshold value.

4. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

calculating an estimated amount of radiation irradiated on the storage phosphor sheet based on the image signals detected by the photomultiplier;

cumulatively adding the estimated amount of radiation for each radiation image read out by the radiation image reading unit;

obtaining the cumulative value of the estimated amounts as the information that indicates the sensitivity change in the photomultiplier; and alarming when the cumulative value has amounted to or exceeded a predetermined threshold value.

5. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating an estimated amount of radiation irradiated on the storage phosphor sheet based on the exposure conditions obtained;

cumulatively adding the estimated amount of radiation for each radiation image read out by the radiation image reading unit;

obtaining the cumulative value of the estimated amounts as the information that indicates the sensitivity change in the photomultiplier; and correcting the sensitivity of the photomultiplier based on the cumulative value.

6. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

calculating an estimated amount of radiation irradiated on the storage phosphor sheet based on the image signals detected by the photomultiplier;

cumulatively adding the estimated amount of radiation for each radiation image read out by the radiation image reading unit;

obtaining the cumulative value of the estimated amounts as the information that indicates the sensitivity change in the photomultiplier; and correcting the sensitivity of the photomultiplier based on the cumulative value.

7. A method for estimating sensitivity change in a photomultiplier used in a radiation image reading unit in which a radiation image recorded on a storage phosphor sheet though the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating a first estimated amount of radiation irradiated on the storage phosphor sheet based on the exposure conditions obtained;

cumulatively adding the first estimated amount of radiation for each radiation image read out by the radiation image reading unit to obtain the first cumulative value of the estimated amounts;

calculating a second estimated amount of radiation irradiated on the storage phosphor sheet based on the image signals detected by the photomultiplier;

cumulatively adding the estimated amount of radiation for each radiation image read out by the radiation image reading unit to obtain the second cumulative value of the estimated amounts; and obtaining the difference between the first and second cumulative values as the information that indicates the sensitivity change in the photomultiplier.

8. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating a first estimated amount of radiation irradiated on the storage phosphor sheet based on the exposure conditions obtained;

cumulatively adding the first estimated amount of radiation for each radiation image read out by the radiation image reading unit to obtain the first cumulative value of the estimated amounts;

calculating a second estimated amount of radiation irradiated on the storage phosphor sheet based on the image signals detected by the photomultiplier;

cumulatively adding the estimated amount of radiation for each radiation image read out by the radiation image reading unit to obtain the second cumulative value of the estimated amounts;

obtaining the difference between the first and second cumulative values as the information that indicates the sensitivity change in the photomultiplier; and alarming when the difference between the first and second cumulative values has amounted to or exceeded a predetermined threshold value.

9. A method for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, wherein information that indicates the sensitivity change in the photomultiplier is obtained by the steps of:

obtaining exposure conditions which were set when the radiation image was recorded on the storage phosphor sheet;

calculating a first estimated amount of radiation irradiated on the storage phosphor sheet based on the exposure conditions obtained;

cumulatively adding the first estimated amount of radiation for each radiation image read out by the radiation image reading unit to obtain the first cumulative value of the estimated amounts;

calculating a second estimated amount of radiation irradiated on the storage phosphor sheet based on the image signals detected by the photomultiplier;

cumulatively adding the estimated amount of radiation for each radiation image read out by the radiation image reading unit to obtain the second cumulative value of the estimated amounts;

obtaining the difference between the first and second cumulative values as the information that indicates the sensitivity change in the photomultiplier; and correcting the sensitivity of the photomultiplier based on the difference between the first and second cumulative values.

10. An apparatus for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, the apparatus comprising:

an exposure condition obtaining means constructed to obtain exposure conditions which were set when the radiation image was recorded on the storage phosphor sheet; and a sensitivity change information obtaining means constructed to calculate an estimated amount of radiation irradiated on the storage phosphor sheet based on the exposure conditions obtained by the exposure condition obtaining means, to cumulatively add the estimated amount of radiation for each radiation image read out by the radiation image reading unit, and to obtain the cumulative value of the estimated amounts as the information that indicates the sensitivity change in the photomultiplier.

11. The apparatus according to claim 10, further comprising an alarming means for alarming when the cumulative value has amounted to or exceeded a predetermined threshold value.

12. The apparatus according to claim 10, further comprising a sensitivity correcting means constructed to correct the sensitivity of the photomultiplier based on the cumulative value.

13. The apparatus according to claim 10, wherein the exposure conditions are imaging menu items.

14. An apparatus for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, the apparatus comprising a sensitivity change information obtaining means constructed to calculate an estimated amount of radiation irradiated on the storage phosphor sheet based on the image signals detected by the photomultiplier, to cumulatively add the estimated amount of radiation for each radiation image read out by the radiation image reading unit, and to obtain the cumulative value of the estimated amounts as the information that indicates the sensitivity change in the photomultiplier.

15. The apparatus according to claim 14, further comprising an alarming means for alarming when the cumulative value has amounted to or exceeded a predetermined threshold value.

16. The apparatus according to claim 14, further comprising a sensitivity correcting means constructed to correct the sensitivity of the photomultiplier based on the cumulative value.

17. An apparatus for estimating sensitivity change in a photomultiplier used in a radiation image reading unit in which a radiation image recorded on a storage phosphor sheet through the exposure of the radiation carrying the image is read out by irradiating excitation light on the storage phosphor sheet to produce stimulated luminescence light, and obtaining image signals that correspond to the radiation image through photoelectrical detection of the stimulated luminescence light emitted from the storage phosphor sheet using the photomultiplier, the apparatus comprising:

an exposure condition obtaining means constructed to obtain exposure conditions which were set when the radiation image was recorded on the storage phosphor sheet;

a sensitivity change information obtaining means constructed to calculate a first estimated amount of radiation irradiated on the storage phosphor sheet based on the exposure conditions obtained by the exposure condition obtaining means, to cumulatively add the first estimated amount of radiation for each radiation image read out by the radiation image reading unit to obtain the first cumulative value of the estimated amounts, to calculate a second estimated amount of radiation irradiated on the storage phosphor sheet based on the image signals detected by the photomultiplier, to cumulatively add the second estimated amount of radiation for each radiation image read out by the radiation image reading unit to obtain the second cumulative value of the estimated amounts, and to obtain the difference between the first and second cumulative values as the information that indicates the sensitivity change in the photomultiplier.

18. The apparatus according to claim 17, further comprising an alarming means for alarming when the difference between the first and second cumulative values has amounted to or exceeded a predetermined threshold value.

19. The apparatus according to claim 17, further comprising a sensitivity correcting means constructed to correct the sensitivity of the photomultiplier based on the difference between the first and second cumulative values.

* * * * *